United States Patent [19]
Kitaguchi et al.

[11] Patent Number: 5,463,729
[45] Date of Patent: Oct. 31, 1995

[54] IMAGE GENERATION DEVICE

[75] Inventors: Yuko Kitaguchi, Osaka; Hiroshi Ohta, Nara, both of Japan

[73] Assignee: Matsushita Electric Industrial Co., Ltd., Osaka, Japan

[21] Appl. No.: 124,691

[22] Filed: Sep. 20, 1993

[30] Foreign Application Priority Data

Sep. 21, 1992 [JP] Japan ................................. 4-251026
Apr. 13, 1993 [JP] Japan ................................. 5-085931

[51] Int. Cl.⁶ ................................................. G06F 15/62
[52] U.S. Cl. ................................................. 395/161
[58] Field of Search ........................... 395/133, 134, 395/135, 155, 161, 156, 159; 345/121, 27

[56] References Cited

U.S. PATENT DOCUMENTS

| | | | |
|---|---|---|---|
| 4,958,303 | 9/1990 | Assarpour et al. | 364/521 |
| 5,068,906 | 11/1991 | Kosaka | 382/48 |
| 5,163,095 | 11/1992 | Kosaka | 382/6 |
| 5,287,440 | 2/1994 | Yamaashi et al. | 395/134 |
| 5,315,693 | 5/1994 | Hirosawa | 395/128 |
| 5,321,798 | 6/1994 | Burman et al. | 395/135 |

FOREIGN PATENT DOCUMENTS

| | | |
|---|---|---|
| 0309373 | 8/1988 | European Pat. Off. . |
| 0387981 | 1/1990 | European Pat. Off. . |
| 0428164 | 11/1990 | European Pat. Off. . |
| 0449469 | 3/1991 | European Pat. Off. . |
| 1437795 | 7/1973 | United Kingdom . |
| 9102122 | 11/1991 | WIPO . |

*Primary Examiner*—Phu K. Nguyen
*Attorney, Agent, or Firm*—Price, Gess & Ubell

[57] ABSTRACT

An image generation device includes a graphic data generation unit for generating at least one of character data, diagram data, and picture data, a graphic data storage for holding groups of graphic data each of which is placed on a coordinate system to be transformed in a manner and location data corresponding to each group of graphic data, a graphic parameter input unit for inputting data including a plurality of parameters each of which describes a transformation of each coordinate system along with a lapse of time, initial and end state of each parameter describing the parameter at start and end of the transformation respectively, and operation time taken from the start to the end of the transformation, a graphic parameter storage for holding the data inputted by the graphic parameter input unit, a frame data generation unit for time dividing changes observed from the start to the end of the transformation into a number of frames corresponding to the operation time to generate frame data, and a composite image generation unit for reading the graphic data on the all coordinate systems, converting coordinates of each graphic data in accordance with the frame data, and generating a composite image signal for each frame by composing the graphic data on the all coordinate systems.

21 Claims, 18 Drawing Sheets

Fig.6A

| coordinate system CS 1 | | |
|---|---|---|
| graphic data | diagram | |
| | circle | rectangle |
| | coordinates of center point<br><br>radius<br><br>thickness of line<br><br>color of line<br><br>color for inside of circle<br><br>opacity | coodinates of upper left corner<br><br>hight<br><br>width<br><br>thickness of line<br><br>color of line<br><br>color for inside of rectangle<br><br>opacity |

Fig.6B

| coordinate system CS 2 | | |
|---|---|---|
| graphic data | character | |
| | 1 | 2 |
| | font<br><br>graphics location<br><br>number of characters<br><br>character code<br><br>color of character<br><br>hight of character<br><br>width of character<br><br>opacity | font<br><br>graphics location<br><br>number of characters<br><br>character code<br><br>color of character<br><br>hight of character<br><br>width of character<br><br>opacity |

Fig.8

| coordinate system | CS 1 | |
|---|---|---|
| frame number | 1 | n |
| displacement | initial coordinate | end coordinate |
| magnification reduction | initial state<br>$\begin{cases} \cdot \text{ reference point} \\ \cdot \text{ magnification in x direction} \\ \cdot \text{ magnification in y direction} \end{cases}$ | end state<br>$\begin{cases} \cdot \text{ reference point} \\ \cdot \text{ magnification in x direction} \\ \cdot \text{ magnification in y direction} \end{cases}$ |
| rotation | initial state<br>$\begin{cases} \text{central point} \\ \text{angle of rotation} \end{cases}$ | end state<br>$\begin{cases} \text{central point} \\ \text{angle of rotation} \end{cases}$ |
| perspective conversion | initial state<br>xy coordinates of four corners | end state<br>xy coordinates of four corners |
| opacity conversion | initial opacity | end opacity |
| clip conversion | initial state<br>$\begin{cases} \text{coordinates of upper left corner} \\ \text{hight} \\ \text{width} \end{cases}$ | end state<br>$\begin{cases} \text{coordinates of upper left corner} \\ \text{hight} \\ \text{width} \end{cases}$ |

Fig.9

| coordinate system | CS 2 | | ... | |
|---|---|---|---|---|
| frame number | 1 | 2 | ... | n |
| displacement | initial coordinates | coordinates at time T2 | ... | end coordinates |
| magnification reduction | initial state { · reference point · magnification in x direction · magnification in y direction } | state at time T2 { · reference point · magnification in x direction · magnification in y direction } | ... | end state { · reference point · magnification in x direction · magnification in y direction } |
| rotation | initial state { central point, angle of rotation } | state at time T2 { central point, angle of rotation } | ... | end state { central point, angle of rotation } |
| perspective conversion | initial state { xy coordinates of four corners } | state at time T2 { xy coordinates of four corners } | ... | end state { xy coordinates of four corners } |
| opacity conversion | initial opacity | opacity at time T2 | ... | end opacity |
| clip conversion | initial state { coordinates of upper left corner, hight, width } | state at time T2 { coordinates of upper left corner, hight, width } | ... | end state { coordinates of upper left corner, hight, width } |

IMAGE GENERATION DEVICE

BACKGROUND OF THE INVENTION

1. Field of the Invention

The present invention relates to an image generation device such as a superimposer or a telop generation device for adding a caption or graphic generated by a computer over a primary picture.

2. Description of the Related Art

Recently an image generation device has been used widely to overlay a graphic image signal with a motion on a background image signal generated by a television camera.

A conventional image generation device will be described hereunder as referring to the attached figures.

Construction of the conventional image generation device is shown in FIG. 1. In the figure the conventional image generation device comprises a graphic data generation unit 1, a graphics processing unit 2, a composing unit 3, an image reproduction unit 4, and a display unit 5.

Operation of the conventional image generation device with the above construction will be described. The graphic data generation unit 1 generates graphic data 11 for a first image frame. The graphic data 11 includes letters, drawings, and location information relating to the drawings. When completing the graphic data 11 for the first image frame, the graphic data generation unit 1 transmits it to the graphics processing unit 2. Receiving the graphic data for the first image frame, the graphic processing unit 2 stores it into an image data memory. After storing the graphic data for the first image frame into the image data memory, the graphic data generation unit 2 generates graphic data for a second image frame. When all the image frames are generated, the graphic data is outputted from the image data memory. Then the composing unit 3 combines graphics 12 with an image signal 13 of a background image recorded by a television camera to generate a composite image signal 14. The display unit 5 reproduces the composite image signal 14 and displays it on a television screen.

Thus, the conventional graphic image generation device generates a graphic image signal by generating graphic data for each image frame. A plurality of graphic data need to be generated for a single image frame to describe a plurality of motions. To generate a graphic image signal with a plurality of motions by the conventional graphic image generation device, the following methods are conceivable.

The same number of the graphic data generation units and the graphics processing units as the graphic data may be operated; and the composing unit may combine all the graphic data with the primary background image signal. Otherwise, the graphic data generation unit generates graphic data first; and the graphics processing unit 2 adds another graphic data thereon. This will be repeated until the number of the graphic data added by the graphics processing unit 2 is consistent with the number of the graphic data. Then, all the graphic data are combined with the primary background image by the composing unit.

Each of the above conceivable methods to be employed by the conventional image generation device has its own drawback. That is, having the same number of the graphic data generation units and the graphics processing units as the graphic data increases the size of the image generation device; while adding another graphic data on the previously generated graphic data in a repeated manner costs much labor.

SUMMARY OF THE INVENTION

Accordingly, it is an object of the present invention to provide an image generation device which can combine a plurality of graphic data without making the device large.

It is another object of the present invention to provide an image generation device which can input graphic data describing a motion quite easily.

The above object may be fulfilled by an image generation device comprising a graphic data generation unit for generating at least one of character data, diagram data, and picture data; a first graphic data storage for holding a group of graphic data which is to be subject to a given transformation over a period of time, and location data corresponding to each group of graphic data which is placed on one coordinate system; a second graphic data storage for holding a different group of graphic data which is subject to a different transformation to said given transformation for the group of graphic data stored in the first graphic data storage, and location data corresponding to said different graphic data which is placed on a different coordinate system; a graphic parameter input unit for inputting data including a transformation for each coordinate system, starting and ending parameters describing the state of image data at a start and an end of the transformation, respectively, and an operation time taken from the start to the end of the transformation; a graphic parameter storage for holding the data inputted by the graphic parameter input unit; a frame data generation unit for generating frame data which describes transitional parameters for every image frame between the start and the end of the transformation, based on the data stored by the graphic parameter storage; and a composite image generation unit for reading the graphic data on each coordinate system from both of the graphic data storage, and, by converting each image frame in accordance with the transitional parameters corresponding to each piece of graphic data based on the frame data, for forming all of the graphic data on an absolute coordinate system which is outputted as a composite image signal for each frame.

The graphic parameter input unit may have keys each corresponding to parallel displacement, magnification and reduction, rotation, perspective conversion, and clip conversion.

The graphic parameter storage may have a storage area for each coordinate system which has at least a sub area for holding the initial and the end state of the transformation of the coordinate system.

The frame data generation unit may be comprised of a computation unit for computing the number of frames corresponding to the operation time, and an interpolation and assignment unit for assigning the initial state and the end state to a first image frame and a final image frame respectively, interpolating a transitional state placing between the initial state and the end state, and assigning the transitional state to a frame placing between the first image frame and the final image frame.

The graphic parameter input unit may further be comprised of a selection key for selecting a combination of two transformations, a storage unit for holding at least the starting parameters and the ending parameters of all of the transformations, and a transmission unit for reading data from the storage area corresponding to the combination selected by the selection key and transmitting the date to the graphic parameter storage.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6A and FIG. 6B show contents of graphics information storage;

FIG. 8 shows content of a compound coordinate data storage;

FIG. 9 shows data generated by a compound coordinate conversion data generation unit;

DESCRIPTION OF THE PREFERRED EMBODIMENTS

Figure 1:
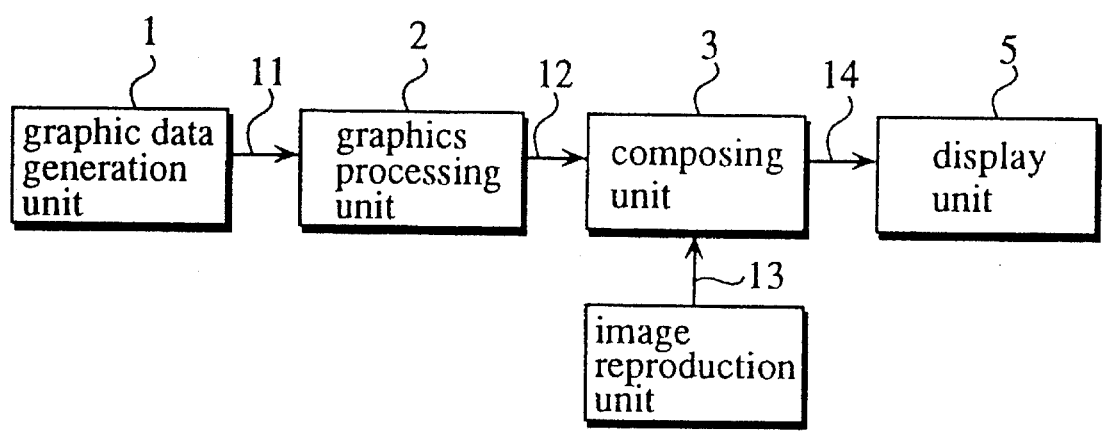
FIG. 1 is a block diagram showing construction of a conventional image generation device.
Figure 2:
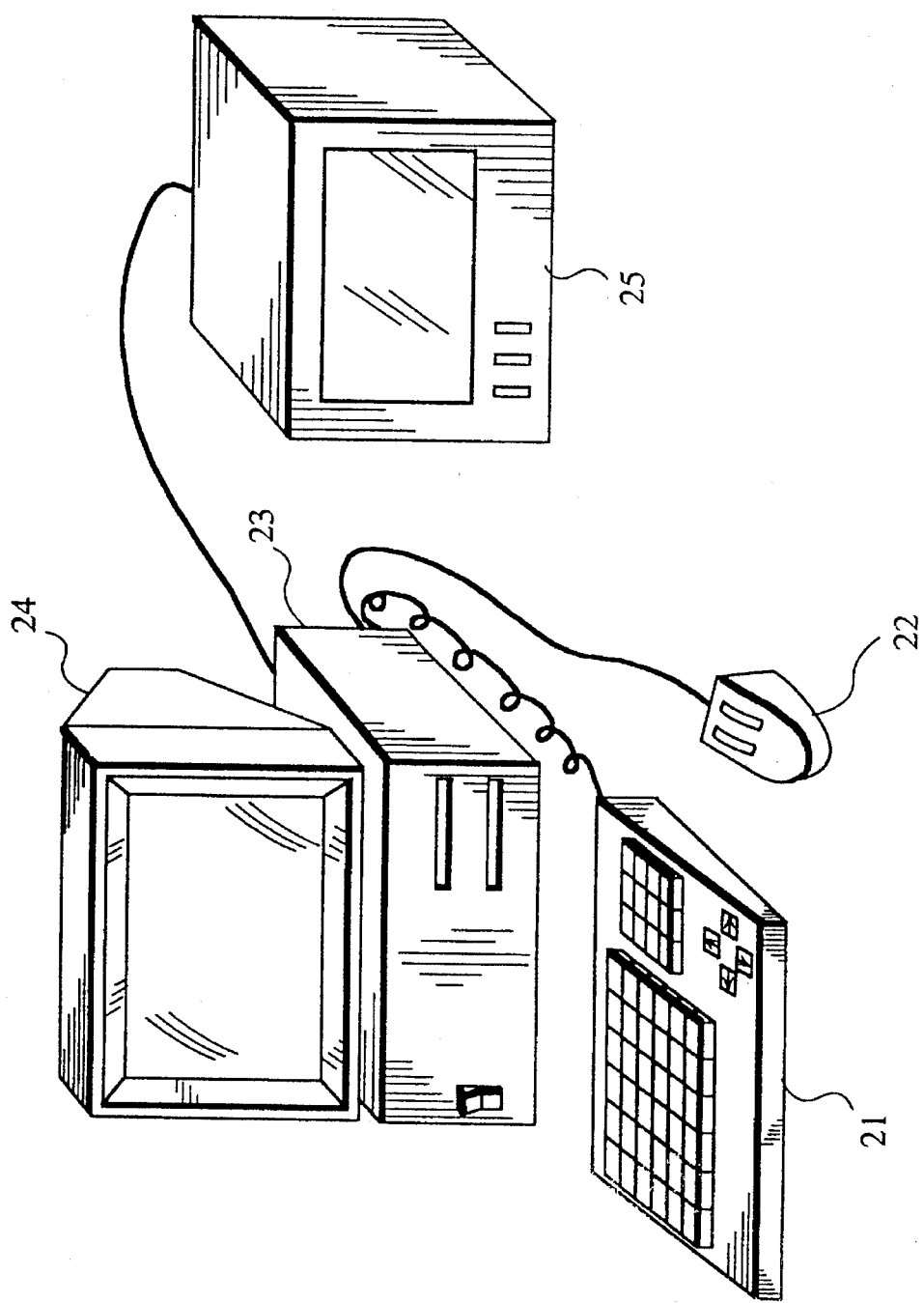
FIG. 2 shows a system for an image generation device in the present invention.

Overall system of an image generation device is shown in FIG. 2, which includes a key board 21, a mouse 22, a controller 23, a CRT 24, and an image reproduction monitor 25.

Figure 3:
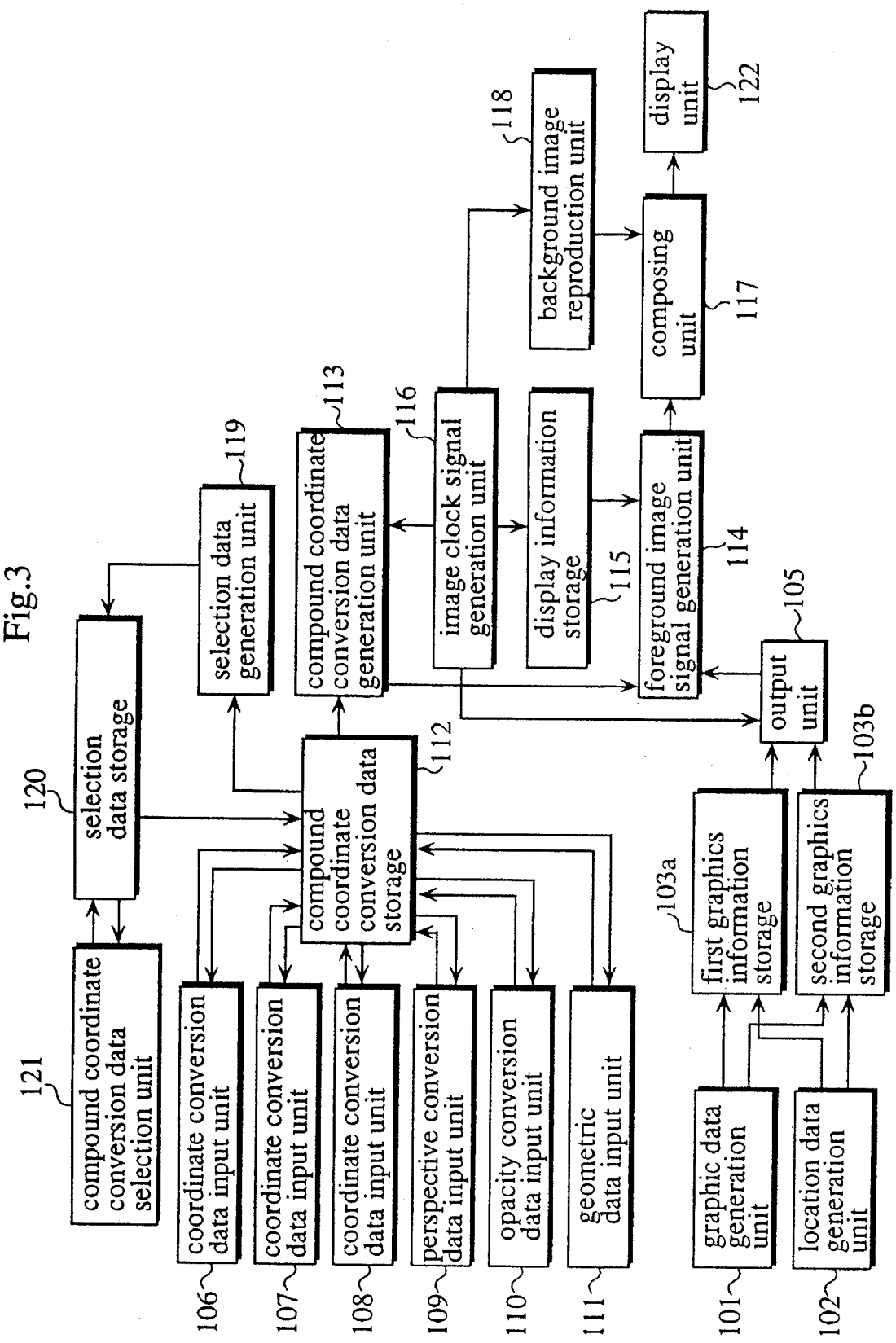
FIG. 3 is a block diagram depicting the image generation device in an embodiment of the present invention.

FIG. 3 is a block diagram showing function of the image generation device in FIG. 2. In the figure, a graphic data generation device 101 comprises the key board 21, the mouse 22, and a graphic data generation program stored in the controller 23. Graphic data refers to diagram data 201, such as circles and rectangles in FIG. 4, or character data 203. Picture data such as a cartoon character or an animal are also included in the graphic data although they are not illustrated in the figure. Graphic data does not refer to a visual image of a diagram or a character, but refers to location data and character code representing the diagram and the character respectively. Picture data indicating a cartoon character or an animal, on the other hand, represents its visual image.

The graphic data generation unit 101 generates graphic data on a coordinate system in digital form. Graphic data will be generated on the same coordinate system until the user directs replacement of the coordinate system with another coordinate system with a specific key. That is, once the user directs the replacement of the coordinate system, graphic data to be generated thereafter will be placed on another coordinate system.

All the graphic data on the same coordinate system is to be transformed in the same manner. That is, a transformation operation such as parallel displacement or rotation is applied to a coordinate system; accordingly, all the graphic data on the same coordinate system is transformed in the same manner without destructing the relationship among the graphic data.

The graphic data generation unit 101 can generate graphic data on any number of coordinate systems rather than generating all the graphic data on a single coordinate system. Since single transformation operation is applied to all the graphic data on the same coordinate system, graphic data to be transformed differently will be generated on a different coordinate system.

Figure 5:
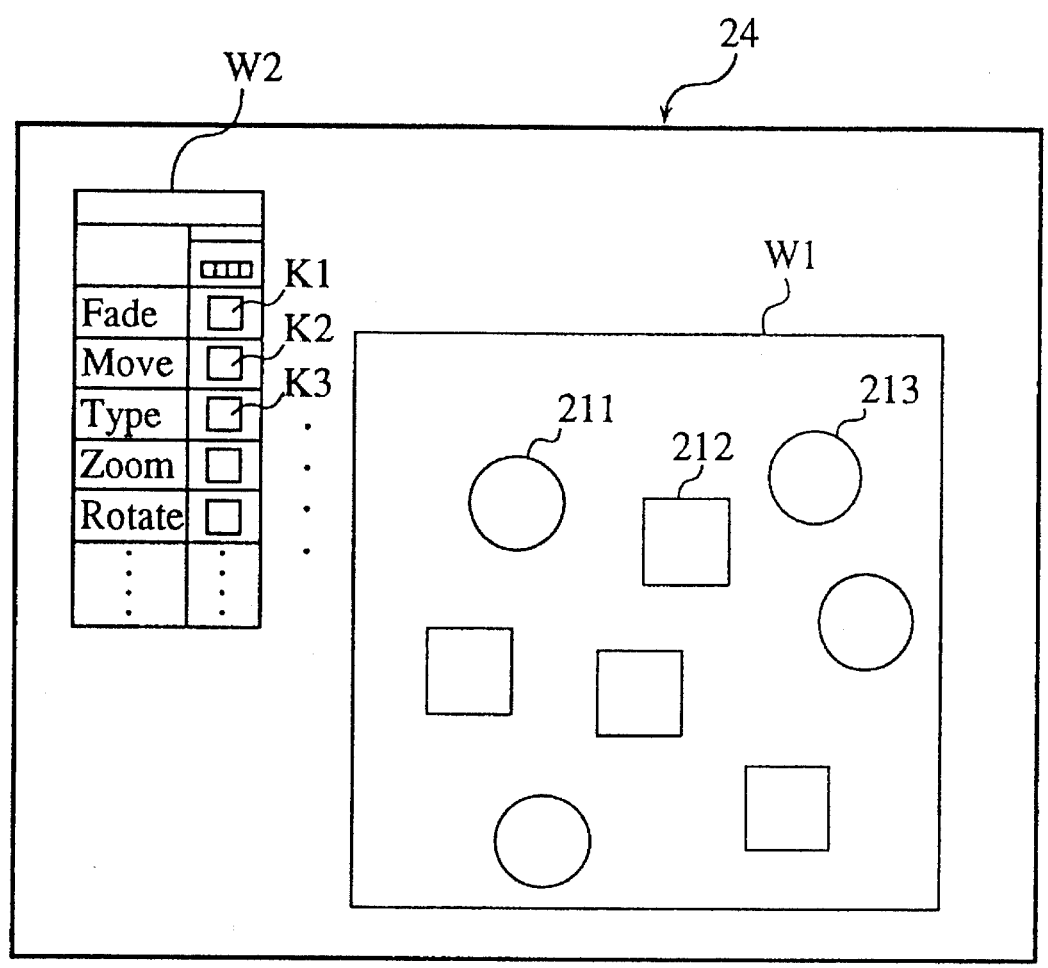
FIG. 5 shows a display at generation of graphic data.

Graphic data generated on a coordinate system is displayed on a screen of the CRT 24. As shown in FIG. 5, the screen of the CRT 24 obtains a window W1 and a window W2 when the image generation device starts operating. The window W1 displays graphic data 211, 212, 213; and the window W2 displays transformation input keys including K1, K2 and the like.

Figure 4:
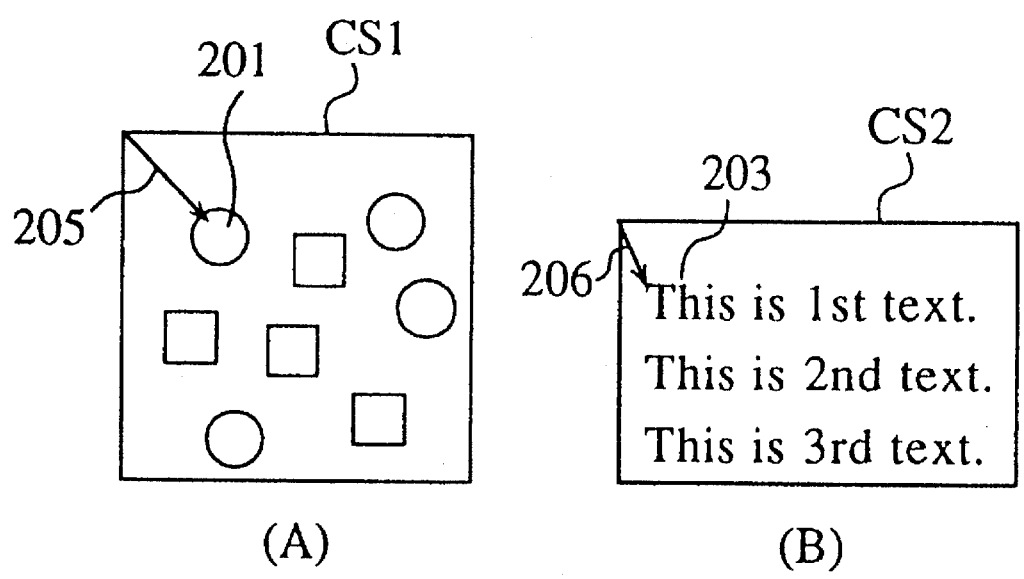
FIG. 4 shows an example of graphic data.

A location data generation unit 102 generates location data which represents relative location of graphic data. The location data describes relative coordinates of graphics included in the graphic data to the origin of the coordinate system. For example, each of location data 205, 206 in FIG. 4 represents relative coordinates of graphics 201 and 203 to coordinate systems CS1, CS2 respectively. The origin of the coordinate system is consistent with the origin of the absolute coordinate system unless it is instructed differently. If the graphic system is displaced in parallel or rotates, the origin of the graphic system will not be consistent with the origin of the absolute coordinates any longer. Accordingly, when location of graphics is designated by the mouse, relative location of the graphics is detected by counting the number of pulses generated by an encoder. When location of graphics is designated by the cursor, on the hand, relative location of the graphics is obtained by detecting location of the cursor.

Each of graphics information storage 103a and 103b holds graphics information relating to each of the coordinate systems. FIGS. 6A and 6B show content of the graphics information storage 103a and 103b respectively.

FIG. 6A shows graphics information relating to the graphic data on the coordinate system CS1. As is shown in the figure, circles and rectangles are drawn on the coordinate system CS1. Furthermore, the graphics information in the figure includes the location data such as coordinates of the circles and the rectangles as well as their characteristic features.

FIG. 6B shows graphics information relating to the graphic data on the coordinate system CS2. As is shown in the figure, two groups of characters are generated on the coordinate system CS2. Further, graphics information in the figure includes the location data and characteristic features of the characters which are necessary to generate them, such as font or opacity of the characters.

An output unit 105 is synchronized with a signal outputted from an image clock signal generation unit 116 for each frame, reads data from the graphics information storage 103a and 103b, and sends the data to a foreground image signal generation unit 114. To be noted, the output unit 105 operates only when graphic data is reproduced. That is, it does not operate when graphics is generated or coordinate conversion data is inputted.

A coordinate conversion data input unit 106 inputs coordinate conversion data which directs a parallel displacement of a coordinate system; a coordinate conversion input unit 107 inputs coordinate conversion data which directs magnification and reduction of a coordinate system; a coordinate conversion data input unit 108 inputs coordinate conversion data which directs rotation of a coordinate system; a perspective conversion data input unit 109 inputs conversion data which directs perspective conversion of a coordinate system; an opacity conversion data input unit 110 inputs conversion data which converts opacity of graphic data on a coordinate system; and a geometric data input unit 111 inputs geometric data which clips a coordinate system. When, a transformation operation to be applied to a coordinate system is designated, the input unit(s) 106–111 corresponding to the designated transformation operation is operated to receive information relating to the transformation operation. The information relating to the transformation operation is inputted through the CRT 24, the mouse 22, and the key board 21 to the corresponding input unit.

Figure 7:
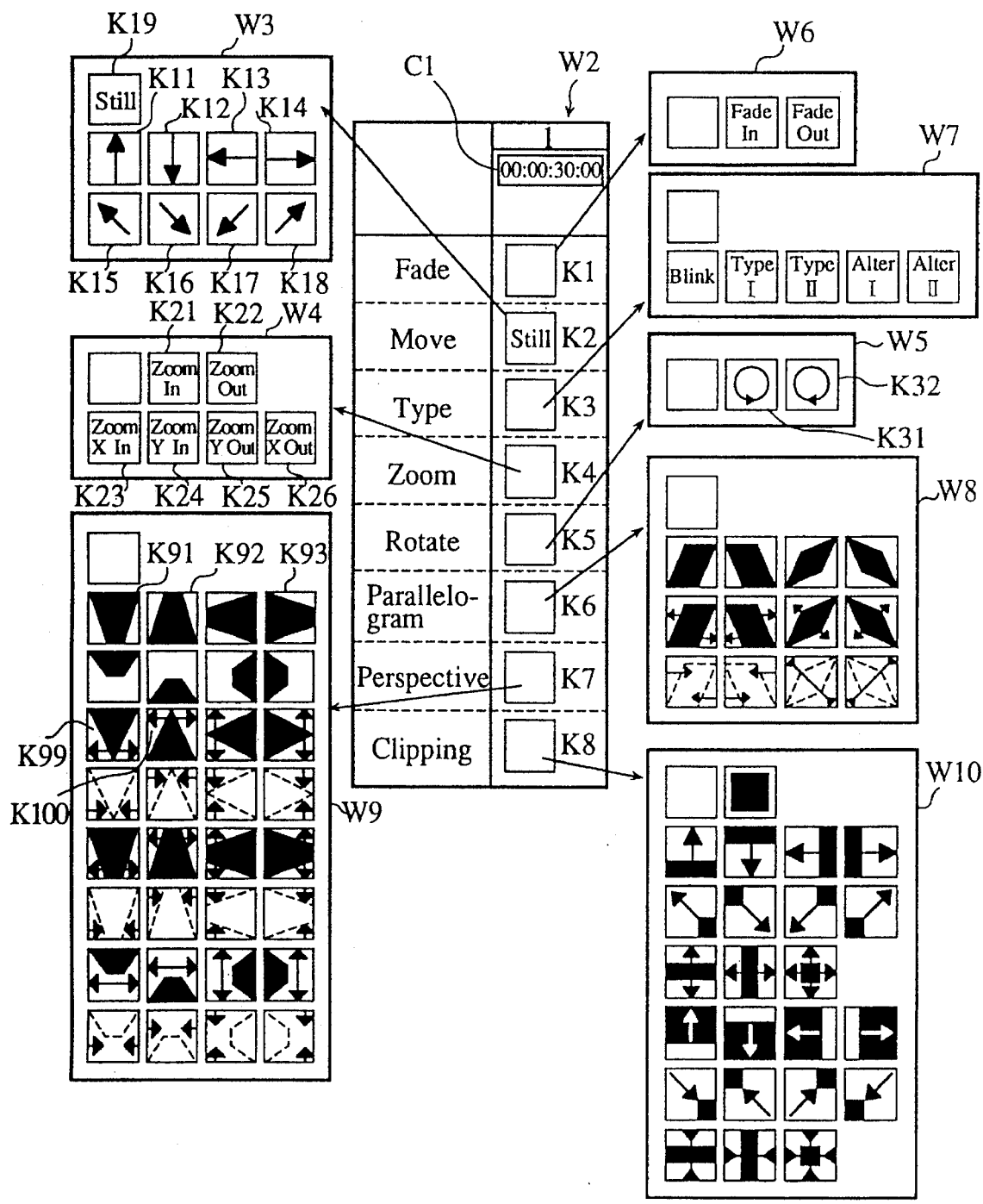
FIG. 7 shows windows for keys to be clicked at input of a transformation.
Figure 10A:
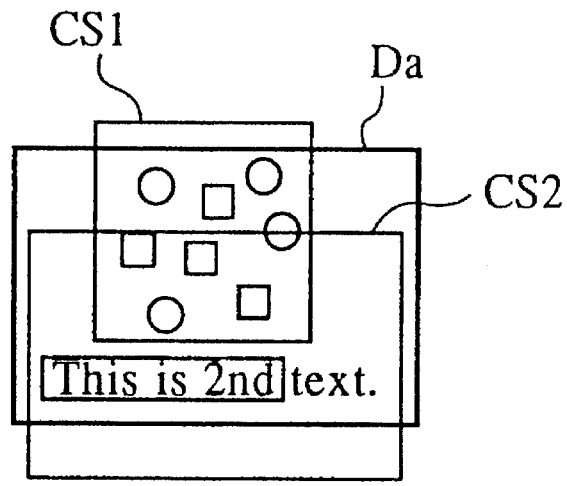
FIG. 10A, FIG. 10B, FIG. 10C, and FIG. 10D describe graphic data on a coordinate system to be displayed.
Figure 10B:
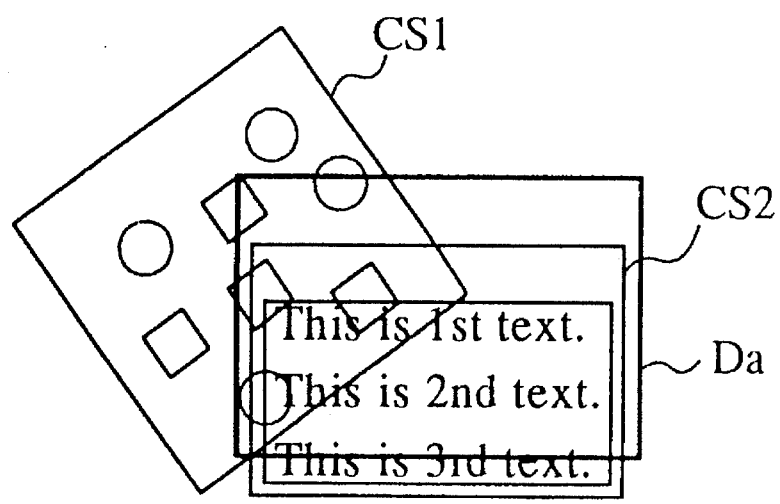
Figure 10C:
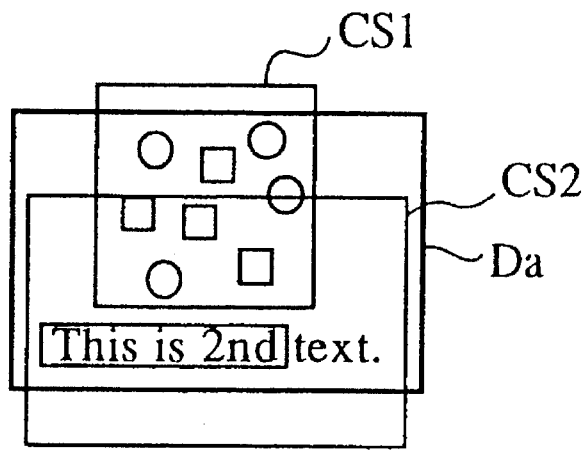
Figure 10D:
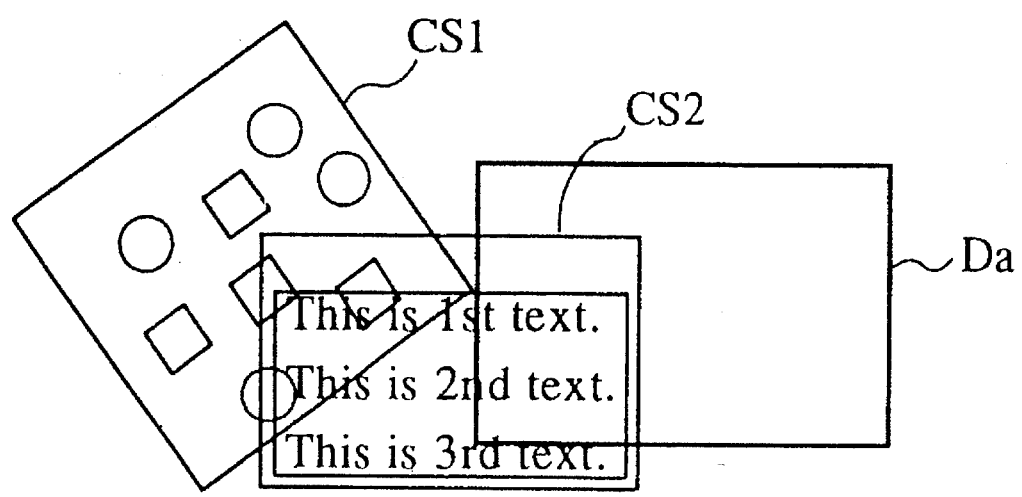
Figure 11:
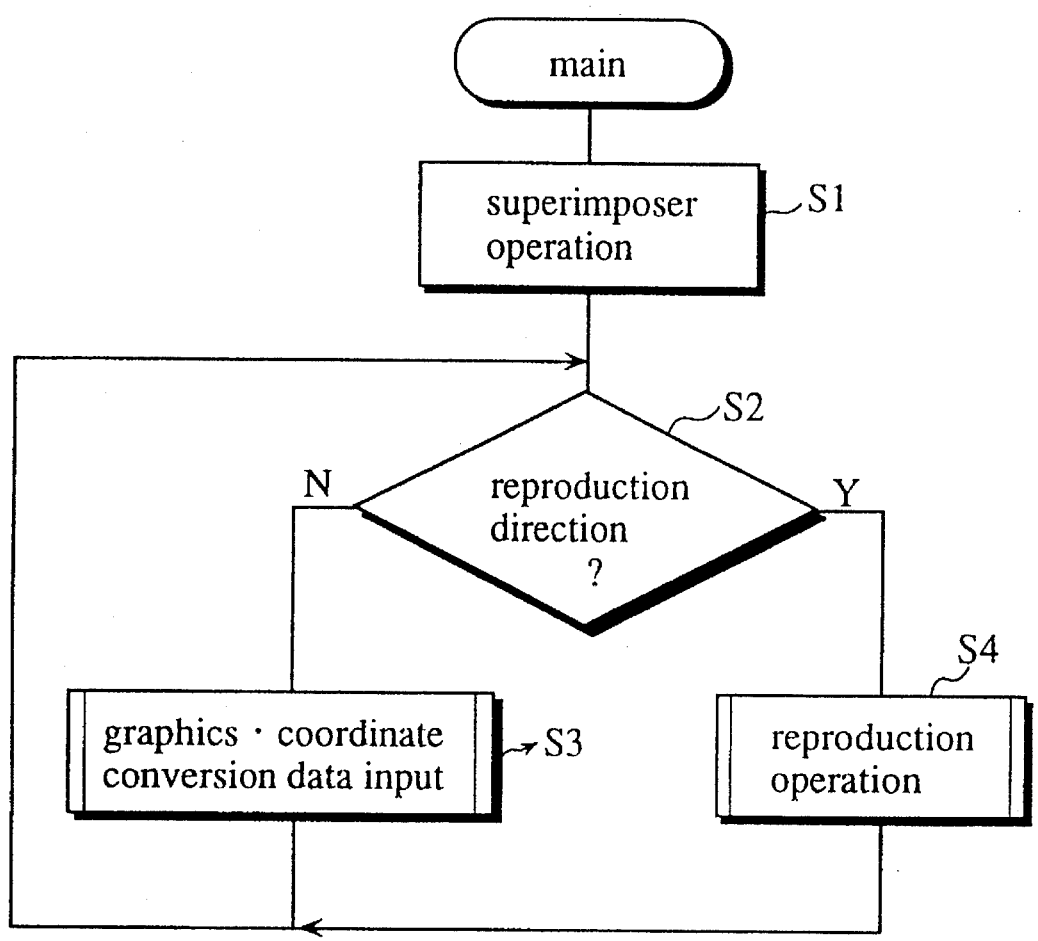
FIG. 11 is a flow chart depicting control operation of the image generation device in the embodiment of the present invention.

For example, the coordinate conversion data input unit 106 displays a window W2 in FIG. 7. A key K2 (move) at W2 corresponds to parallel displacement operation. When the key K2 is clicked by the mouse 22, a window W3 is newly displayed close to the window W2 so that direction of the parallel displacement can be designated. If a key K11 is clicked at the window W3, the displacement operation will be conducted upward from bottom to top of the image reproduction monitor 25. To be noted, the upper end of the coordinate system to be displaced meets with the lower end of the image reproduction monitor 25 when the displacement operation starts; and the displacement operation ends when the lower end of the coordinate system meets with the upper end of the image reproduction monitor 25. The displacement operation selected at W2 and the upward direction of the displacement selected at W3 are outputted. Operation time at a column C1 locating at the upside of the window W2 indicates how long the displacement operation continues, and the displacement operation continues for the operation time unless it is instructed differently.

A key K19 directs still operation. Accordingly, the displacement operation of the coordinate system will stop if the key K19 is clicked. Operation time for the still operation is indicated at the column C1.

A key K4 (zoom) corresponds to magnification and reduction operation. The coordinate conversion data input unit 107 displays a window W4 when the key K4 is selected at the window W2. When one of keys K21–K26 is selected, the magnification or the reduction operation selected at W2, information relating to the operation (magnification/reduction in both x and y directions or magnification/reduction in x direction or y direction) selected at W4, the operation time, and the reference location information are outputted.

A key K5 (rotate) corresponds to rotation operation. The coordinate conversion data input unit 108 displays a window W5 when the key K5 is selected at the window W2. When either of keys K31 and K32 is selected at W5, the rotation operation selected at W2, the direction of the rotation selected at W5, the operation time, and the center of the rotation are outputted. The center of the rotation corresponds to the center of the coordinate system unless it is instructed differently.

If one of keys K1 and K6–8 is selected, one of the input units 108–111 which corresponds to the key displays a window. The window to be displayed (W6, W8–W10) is connected to each key by an arrow in FIG. 7. When a key at the window is clicked to designate transformation operation, transformation information relating to the designated transformation operation is outputted.

A key K91 at the window W9 directs to transform a coordinate system in accordance with a perspective view taken downward from top of the coordinate system. Accordingly, graphic data placing at the upper part of the coordinate system will be magnified while graphic data placing at the lower part of the coordinate system will be reduced. A key 93 directs to transform a coordinate system in accordance with a perspective view take from left to right of the coordinate system. Accordingly, graphic data placing at the right part of the coordinate system will be enlarged and graphic data placing at the left part will be reduced. Also a key including an arrow, such as K99, directs to transform a coordinate system in direction of the arrows in time course.

A key at a window W10 indicates size of a display area at the image reproduction monitor 25 and its change. The blacken portion corresponds to the display area.

A compound coordinate conversion data storage 112 comprises a memory unit such as RAM for holding the coordinate conversion data outputted from the input units 106–111. As an example, FIG. 8 shows coordinate conversion data relating to the coordinate system CS1. Thus, coordinate conversion data relating to each coordinate system is inputted by the input units 106–111, and it is stored in the compound coordinate conversion data storage 112.

A compound coordinate conversion data generation unit 113 does not operate while graphics is being drawn or coordinate conversion data is being inputted. A user starts operation of the compound coordinate conversion data generation unit 113 with a specific key.

The compound coordinate conversion data generation unit 113 reads data coordinate conversion data relating to a coordinate system from the compound coordinate conversion data storage 112; generates a frame of coordinate conversion data; and outputs it to a foreground image signal generation unit 114 at reception of a signal from an image clock signal generation unit 116.

FIG. 9 shows a frame of coordinate conversion data generated by the compound coordinate conversion data generation unit 113. The coordinate conversion data in FIG. 9 relates to the coordinate system CS 1. A frame of the compound coordinate conversion data in the figure includes location data and characteristic features such as coordinates and opacity. The compound coordinate conversion data in FIG. 9 is generated as basing upon the data in FIG. 8; however, interpolation is required since FIG. 8 does not include all frames being necessary to execute the transformation operation. In FIG. 8, initial state (parameters) and end state of each transformation operation as well the number of frames corresponding to the operation time are provided; therefore, compound coordinate conversion data for each frame will be figured out by time dividing procedures between the initial state and the end state into the frames. As an example, it is assumed that parallel displacement of the coordinate system CS1 is directed; initial coordinates and end coordinates are (X1, Y1) and (Xn, Yn) respectively; and the number of frames taken in the parallel displacement is N. In this case, coordinate data (Xi, Yi) to for each frame will be obtained from following formulae:

$$Xi = \frac{Xn - X1}{N - 1} \times (i - 1) + X1$$

$$Yi = \frac{Yn - Y1}{N - 1} \times (i - 1) + Y1,$$

wherein i is a frame number. Thus, in the parallel displacement xy coordinates for each frame will be obtained by employing a hardware which implements the above operation as interpolation. Although the above formula represents linear interpolation, non-linear interpolations such as Bezier curve can be employed.

Substantially same as the above parallel displacement, interpolations for other transformation operations such as magnification, reduction, and rotation are set; and compound coordinate conversion data for each frame will be obtained by operating a hardware implementing the corresponding interpolations.

A display information storage 115 generates display information indicating a display area of coordinate systems to be displayed on the image reproduction monitor 25 and stores the display information. FIGS. 10A, 10B, 10C, 10D show display areas Da each representing a part of the coordinate systems M1, M2 to be displayed. The display area Da is described by an offset value from the origin of absolute coordinates, and the offset value can be replaced with another by employing the key board 21. Also replacement of the offset value can be scheduled so that the display appears as if the television camera moved itself to take the shot.

The foreground image signal generation unit 114 is synchronized with the image clock to project a frame of a foreground image on the image reproduction monitor 25 in accordance with graphics information outputted from the output unit 105 and compound coordinate conversion data outputted from the compound coordinate conversion data generation unit 113. Graphics information including the location data and the characteristic features represents a frame of graphic data on a coordinate system; and a frame of foreground image will be generated by transforming the graphic data in accordance with the compound coordinate conversion data.

The foreground image signal generation unit 114 comprises a circuit and a hardware for drawing graphics at high speed. The circuit generates commands that can be comprehended by the hardware; and the hardware outputs an image signal of a foreground image to be displayed on the image reproduction monitor 25 in accordance with the commands. An example of such hardware is GSP (Graphic System Processor) produced by Texas Instruments.

The composing unit 117 combines a frame of the foreground image outputted from the foreground image signal generation unit 114 and a background image outputted from a background image reproduction unit 118, and outputs a frame of composite image to a display unit 122. A background image to be reproduced by the background image reproduction unit 118 is an animation film recorded by a video use camera. The display unit 122, such as a color television for processing NTSC (National Television Standards Committee) signals or the like, corresponds to the image reproduction monitor 25 in FIG. 2.

Control operation of the image generation device with the above construction will be described as referring to FIGS. 11-16. A power switch of a superimposer is turned on (S1). It is detected if a key corresponding to reproduction operation was entered (S2). If the key was not entered, operation mode of the image generation device will be changed into graphics.coordinates conversion data input mode immediately (S3). On the other hand, if the key corresponding to reproduction operation was entered, operation mode of the image generation device will be changed into reproduction mode (S4).

Figure 12:
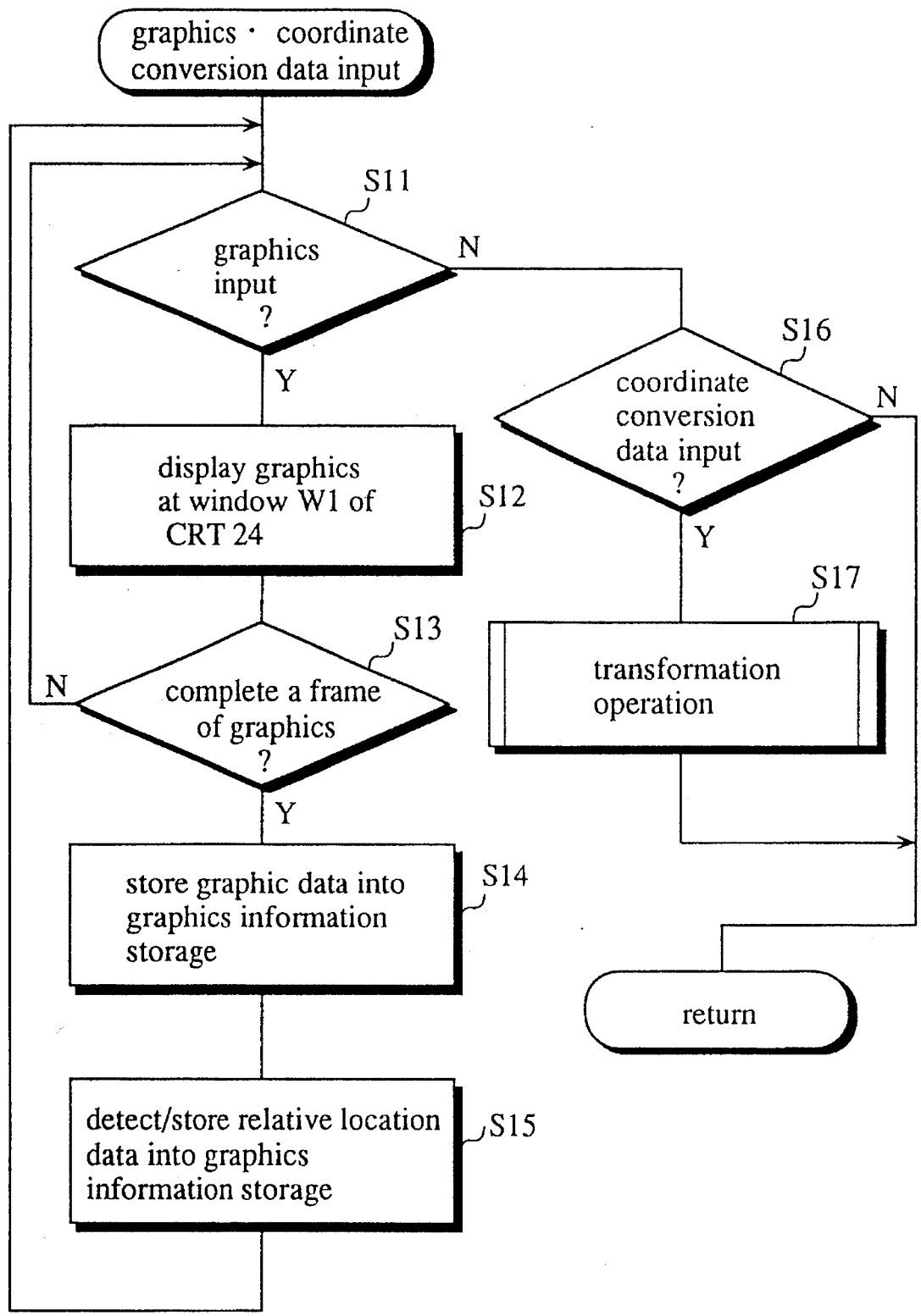
FIG. 12 is a flow chart depicting control operation of the image generation device in the embodiment of the present invention.

Operation of the graphics.coordinates transformation data input mode will be described as referring to FIG. 12. When a user generates graphics by the key board 21 (S11), the graphics is displayed at the window W1 of the CRT 24 (S12). It is detected whether the user completes a frame of graphics (S13). If it is not completed, generation of the graphics will continue (S13→S11→S12). If it is detected that a frame of graphics is completed, characteristic features of the graphics will be stored in the graphics information storage 103a assigned to the coordinate system CS1 (S14); and location data relating to the graphics, including relative coordinates of the graphics to the origin of the coordinate system CS, will be detected and stored into the graphics information storage 103a.

If the user restarts drawing operation (S11), graphics to be drawn by the user this time will be stored into the graphics information storage 103b assigned to the coordinate system CS2 (S14, S15).

The user indicates that the drawing operation was completed by clicking a key at the window W2 with the mouse 22. Accordingly, the operation is forwarded to S16, S17, so that coordinate conversion data input operation will start.

Figure 13:
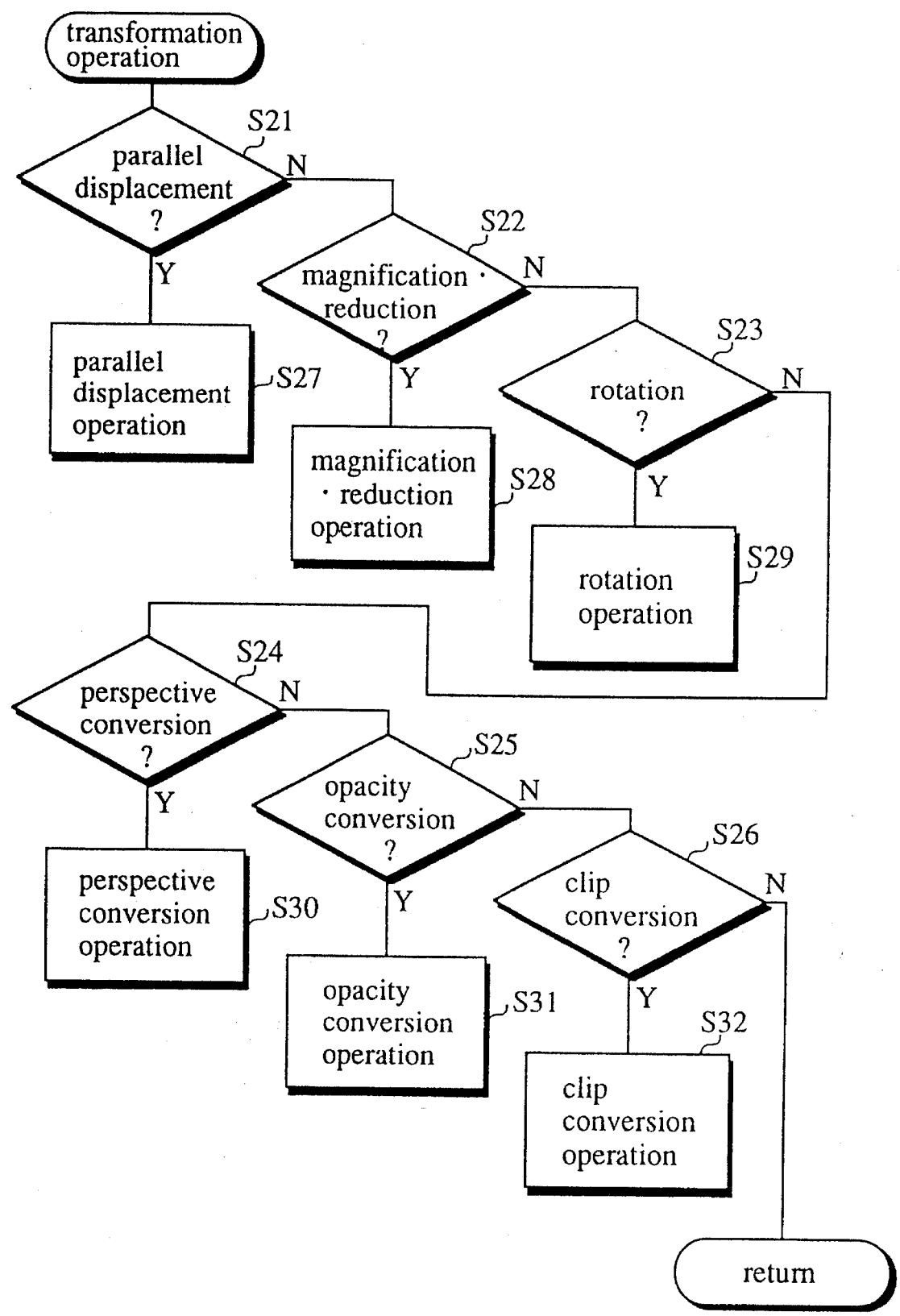
FIG. 13 is a flow chart depicting control operation of the image generation device in the embodiment of the present invention.

FIG. 13 shows transformation operation at S17. The key K1–K6 selected at the window W2 is detected at S21–S27, and the transformation operation relating to the selected key starts (S27–S32).

Figure 14:
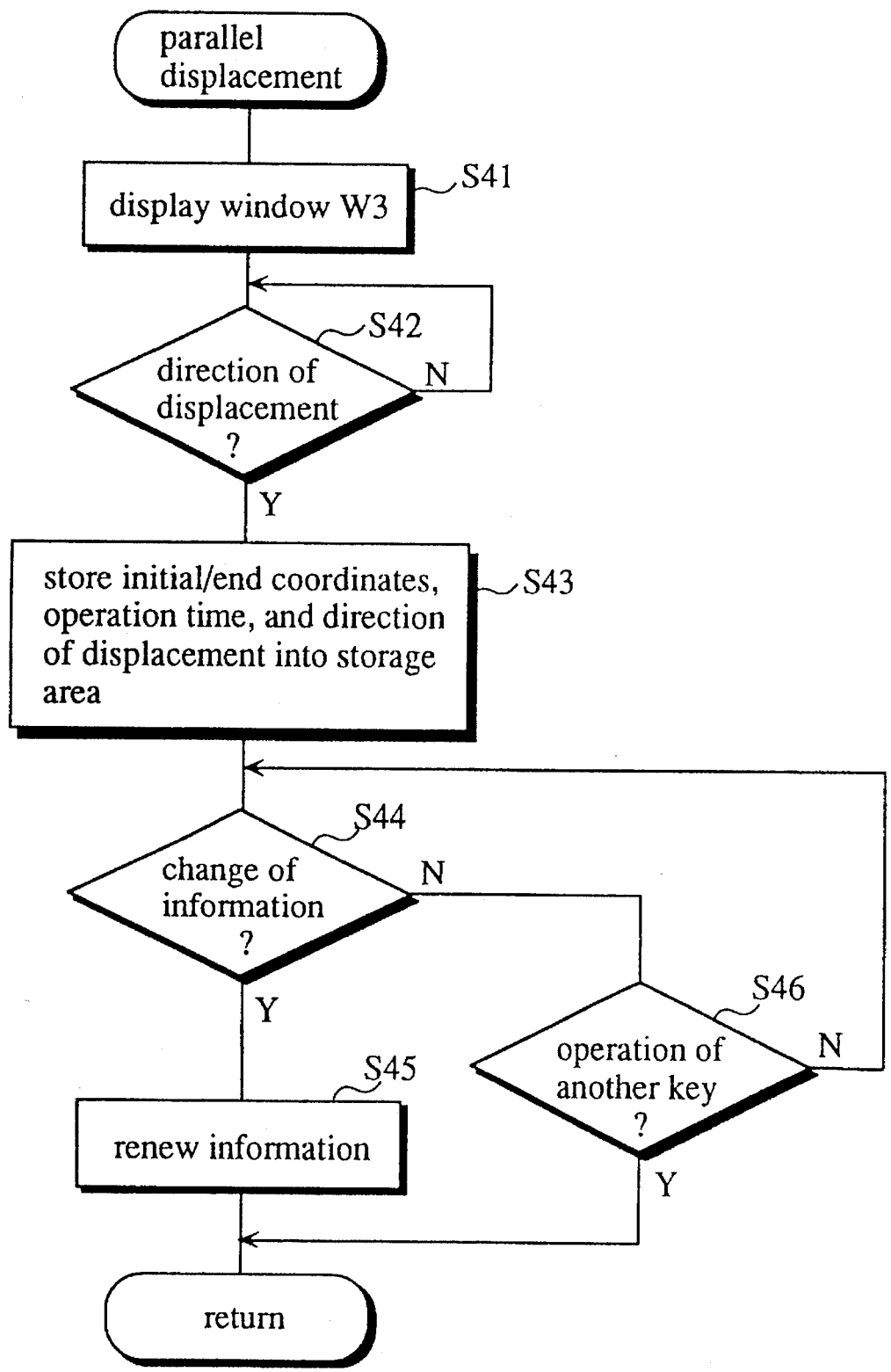
FIG. 14 is a flow chart depicting control operation of the image generation device in the embodiment of the present invention.
Figure 15:
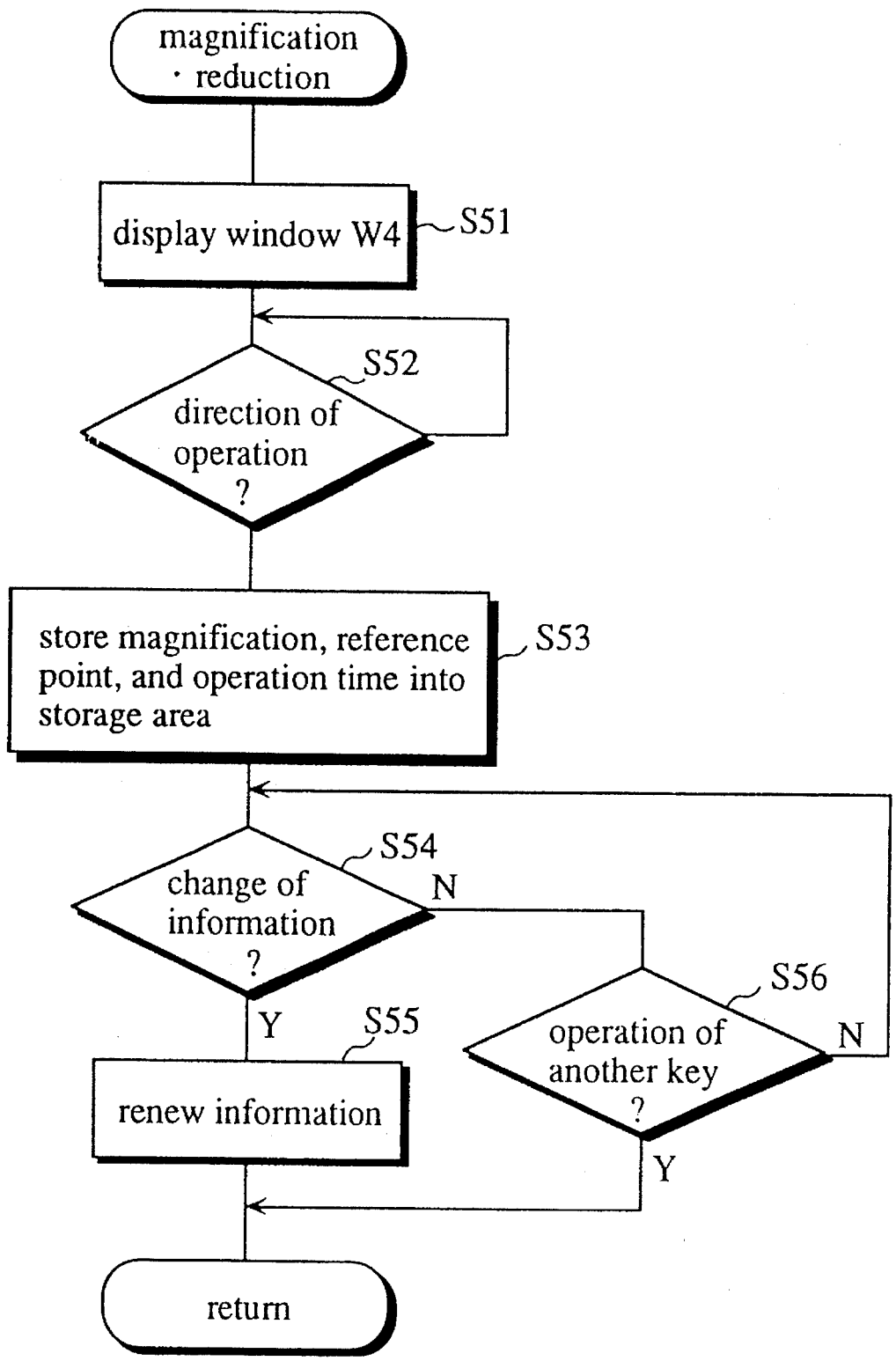
FIG. 15 is a flow chart depicting control operation of the image generation device in the embodiment of the present invention.
Figure 16:
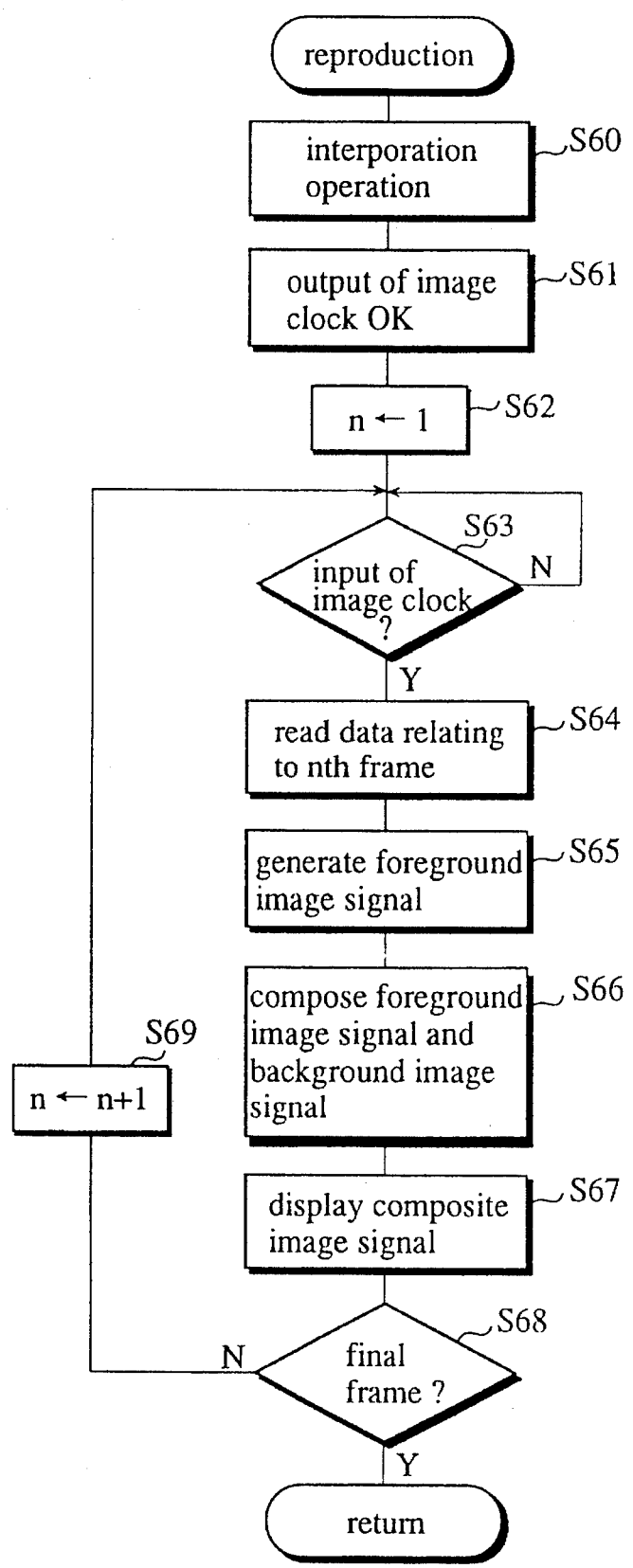
FIG. 16 is a flow chart depicting control operation of the image generation device in the embodiment of the present invention.

For example, if the key K2 for parallel displacement is detected, displacement operation in FIG. 14 will start. That is, the window W2 is replaced with the window W3 in FIG. 7 (S41), and awaits one of keys at the window W3 to be clicked (S42). For example, if the key K11 is clicked, initial coordinates and end coordinates, and operation time all of which are determined beforehand will be stored together with the direction indicated by the key K11 into a storage area of the compound coordinate conversion data storage 112 assigned to the coordinate system (S43). If the user changes the initial coordinate, the end coordinate, or the operation time with a specific key (S44), the data in the compound coordinate conversion data storage 112 will be renewed (S45). Otherwise, the user inputs any of the other keys to indicate that the user does not intend to change them (S46); and the operation will be returned to S1 in FIG. 11.

Then, if the user inputs the key K4 for magnification and reduction, the window W4 will be displayed on the CRT 24 (S51). When one of keys at the window W4 is clicked (S52), information relating to the transformation operation selected at the window W4 is stored into a storage area of the compound coordinate conversion data storage 112 assigned to the coordinate system (S53), the information including magnification, coordinates of a reference point, and operation time. If the user changes the magnification, the reference point, or the operation time with a specific key (S54), the data in the storage 112 will be renewed (S55). If the user inputs one of the other keys to indicate that the user does not intend to change any of the magnification, the reference point, and the operation time, the operation will be returned to S1 in FIG. 11.

Although not illustrated, rotation (S29), perspective conversion (S30), opacity conversion (S31), clip conversion (S32) will be conducted substantially same as the parallel displacement. Also, information relating to these transformation operations are stored in the corresponding storage area of the compound coordinate conversion data storage 112, which was explained in the above as referring to FIG. 8.

When input to a coordinate system is all completed, the user inputs a key to direct reproduction operation. The operation mode is changed into reproduction mode (S4), and reproduction operation in FIG. 16 will start. That is, the compound coordinate conversion data generation unit 113 reads data from the compound coordinate conversion data storage 112. Then, data for each frame will be generated from a predetermined computation and the data obtained from the compound coordinate conversion data storage 112 (S60). Output of the image clock starts is permitted (S61), and its frame number is set to be 1 (S62). When receiving output of the image signal clock (S63), all the data for the first frame including graphics information and compound coordinate conversion data are outputted to the foreground image signal generation unit 114 (S64). The foreground image signal generation unit 114 generates a foreground image signal for the first frame based upon the received data (S65). The composing unit 117 generates a composite image signal by combining the foreground image signal with a background image received from the background image reproduction unit 118 (S66), and displays the composite image signal on the display unit 122 (S67). The frame number at the image clock is forwarded to 2 (S69); and a composite image for the second frame will be generated by operations at S63–67. Thus, a composite image for succeeding frames will be generated by incrementing the frame number by 1, and will be displayed on the display unit. The reproduction operation completes when all the frames are generated.

The image generation device in FIG. 3 further includes a compound coordinate conversion data selection unit 121, a selection data storage 120, and a selection data generation unit 119, which will be described hereunder.

Figure 17:
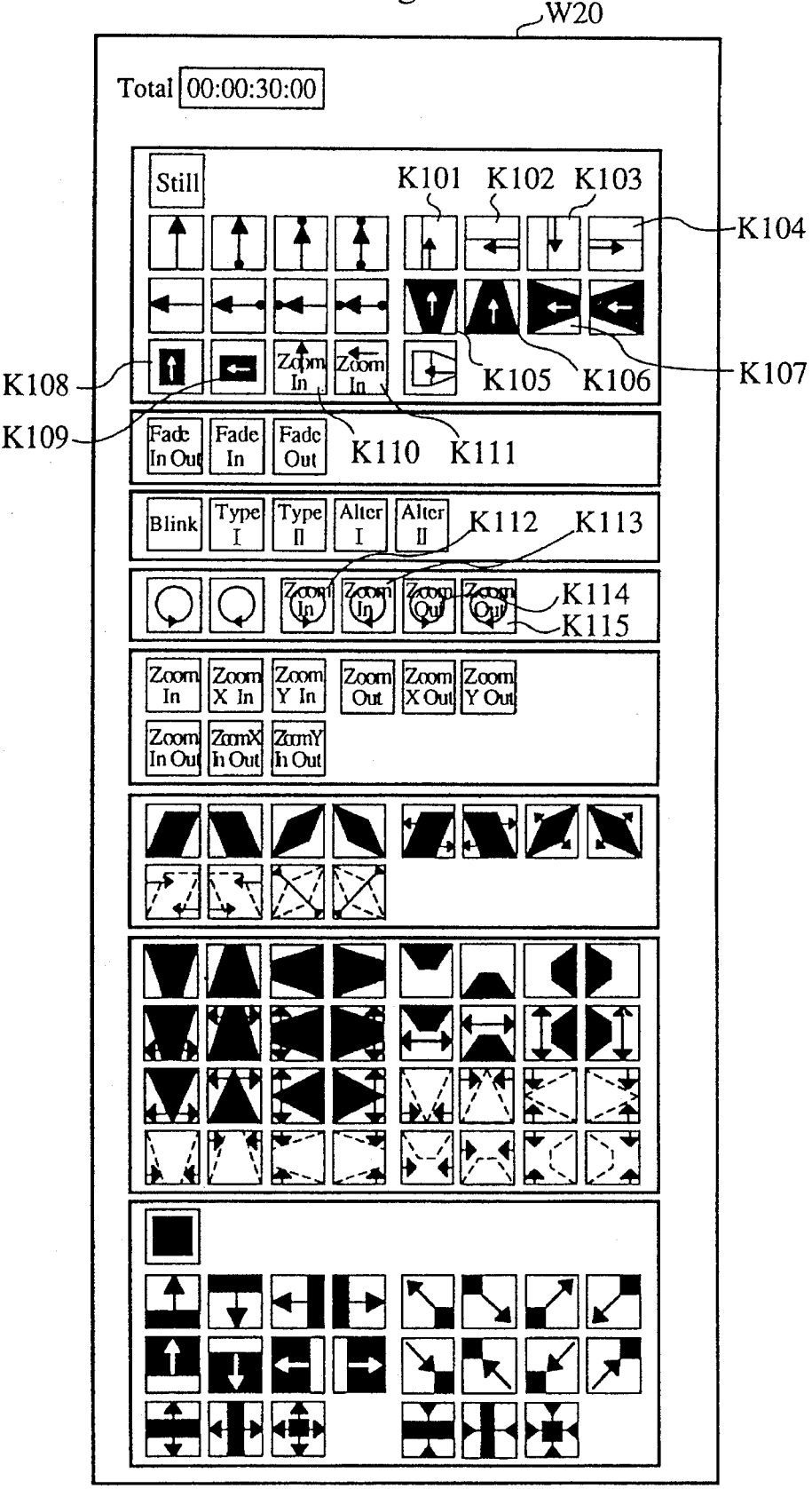
FIG. 17 shows a window to be displayed when a compound coordinate conversion data selection unit is operated.

Operation of the compound coordinate conversion data selection unit 121 corresponds to one or a combination of the coordinate conversion data input units 106–111; therefore, the compound coordinate conversion data selection unit 121 and one of the coordinate conversion data input units 106–111 operates alternatively. If the compound coordinate conversion data selection unit 121 starts operating, a window W20 in FIG. 17 is displayed on the CRT 24 instead of the window W2. The window W20 includes the keys at W3–W9 in FIG. 3, that is, keys K101–K115 at the window W20 direct a combination of two transformation operations. When one of the keys at the window W20 is clicked by the mouse, the compound coordinate conversion data selection unit 121 transmits a selection signal which notifies a selection data storage 120 of the clicked key.

The selection data storage 120 holds data corresponding to each of the keys at W20 so that a coordinate system will be transformed in accordance with the selected key.

Accordingly, when receiving the selection signal from the compound coordinate conversion data selection unit 121, the selection data storage 120 reads data corresponding to the clicked key and sends it to the compound coordinate conversion data storage 112. Although not illustrated, construction of data in the compound coordinate conversion data storage 112 is similar to the data generated by the input units 106–111.

When any of the keys at the window W20 does not correspond to compound coordinate conversion data generated by the input units 106–111, the user operates the selection data generation unit 119 to store the compound coordinate conversion data into the selection data storage 120 and assigns a new key at W20 to it so that the newly stored compound coordinate conversion data can be selected by the corresponding key. That is, a plurality of extra keys are generated at the window W20 other than the keys each assigned to the compound coordinate conversion data; and a storage area corresponding to each of such extra keys is generated at the selection data storage 120. Accordingly, when the selection data generation unit 119 newly generates compound coordinate conversion data and inputs it, the user assigns one of the extra keys to the newly generated compound coordinate conversion data.

Although in the above embodiment only two graphic data information storage 103a and 103b are employed, three or more than three graphics information storages can be employed when the graphic data generation unit 101 generates graphic data on three or more than three coordinate systems.

Although the present invention has been fully described by way of examples with reference to the accompanying drawings, it is to be noted that various changes and modifications will be apparent to those skilled in the art. Therefore, unless otherwise such changes and modifications depart from other scope of the present invention, they should be constructed as being included therein.

What is claimed is:

1. An image generation device comprising:

graphic data generation means for generating at least one of character data, diagram data, and picture data:

a first graphic data storage for holding a group of graphic data which is to be subject to a given transformation over a period of time, and location data corresponding to each group of graphic data which is placed on one coordinate system;

a second graphic data storage for holding a different group of graphic data which is subject to a different transformation to said given transformation for the group of graphic data stored in the first graphic data storage, and location data corresponding to said different graphic data which is placed on a different coordinate system:

graphic parameter input means for inputting data including a transformation of each coordinate system, starting and ending parameters describing the state of image data at a start and an end of the transformation, respectively, and an operation time taken from the start to the end of the transformation;

graphic parameter storage for holding the data inputted by the graphic parameter input means:

frame data generation means for for generating frame data which describes transitional parameters for every image frame between the start and the end of the transformation, based on the data stored by the graphic parameter storage; and composite image generation means for reading the graphic data on each coordinate system from both of the graphic data storages, and, by converting each image frame in accordance with the transitional parameters corresponding to each piece of graphic data based on the frame data, for forming all of the graphic data on an absolute coordinate system which is outputted as a composite image signal for each frame.

2. The image generation device of claim 1, wherein the graphic parameter input means has keys each corresponding to the following transformations: parallel displacement, magnification and reduction, rotation, perspective conversion, and clip conversion.

3. The image generation device of claim 2, wherein the graphic parameter storage has a storage area for each coordinate system which has at least a sub area for holding the initial and the end state of the transformation of the coordinate system.

4. The image generation device of claim 3, wherein the frame data generation means is comprised of a computation unit for computing the number of frames corresponding to the operation time, and an interpolation and assignment unit for assigning the starting and ending parameters to a first image frame and a final image frame, respectively, interpolating transitional parameters between the starting and ending parameters, and assigning the transitional parameters to a frame placed between the first image frame and the final image frame.

5. The image generation device of claim 4, wherein the composite image generation means generates the composite image by composing the composite image signal outputted from the composite image generation means with an image.

6. The image generation device of claim 5 further comprising display means for displaying the composite image generated by the composite image generation means visually.

7. The image generation device of claim 6 further comprising selection means for selecting one of a first mode for generating graphic data and inputting and/or editing each transformation and a second mode for reproducing the graphic data in accordance with the transformation.

8. The image generation device of claim 7 further comprising image clock output means for outputting an image clock to the frame data generation means, to the composite image generation means, and to the composing means when the second mode is selected, so that an image frame will be generated being synchronized with the image clock and the image frame will be displayed at the display means.

9. The image generation device of claim 8 further comprising display information generation means for generating coordinates indicating location of a screen of the display means at an absolute coordinate system, the absolute coordinate system defining absolute location of each coordinate system, wherein the display means displays graphic data locating within the screen together with another image.

10. The image generation device of claim 3, wherein the graphic parameter input means is further comprised of a selection key for selecting a combination of two parameters, a storage unit for holding at least the initial state and the end state of the transformation for all of the parameters, and a transmission unit for reading data from the storage area corresponding to the combination selected by the selection key and transmitting the data to the graphic parameter storage.

11. The image generation device of claim 1, wherein the graphic parameter input means is further comprised of a selection key for selecting a combination of two transformations, a storage unit for holding at least the starting parameters and the ending parameters of all of the transformations, and a transmission unit for reading data from the storage area corresponding to the combination selected by the selection key and transmitting the data to the graphic parameter storage.

12. The image generation device of claim 11, wherein the graphic parameter input means comprises a selection unit for selecting one of a first mode so that each transmission included in the combination is input individually and a second mode so that the transformation embodying the combination are input together.

13. The image generation device of claim 12 further comprising registration means for holding a new combination in a new storage area at the graphic parameter storage, the combination including two of the transformations inputted individually at selection of the first mode.

14. An image generation device comprising:

graphic data generation means for generating at least one of character data, diagram data, and picture data;

graphic data storage for holding a group of graphic data which is to be subject to a given transformation over a period of time, and location data corresponding to each group of graphic data which is placed on one coordinate system;

graphic parameter input means for inputting data including a plurality of parameters, each of which describes a transformation of each coordinate system along with a lapse of time, initial and end state of each parameter describing the parameter at start and end of the transformation respectively, and operation time taken from the start to the end of the transformation;

graphic parameter storage for holding the data inputted by the graphic parameter input means;

frame data generation means for for generating frame data which describes transitional parameters for every image frame between the start and the end of the transformation, based on the data stored by the graphic parameter storage;

composite image generation means for reading the graphic data from the graphic data storage, and, by converting each image frame in accordance with the transition parameters corresponding to the graphic data based on the frame data, for composing all of the graphic data which is outputted as a composite image signal for each frame: and display means for displaying the composite image signal visually.

15. The image generation device of claim 14, wherein the graphic parameter input means has keys each corresponding to the following transformations: parallel displacement, magnification and reduction, rotation, perspective conversion, and clip conversion.

16. The image generation device of claim 15, wherein the graphic parameter storage has a storage area for each coordinate system which has at least a sub area for holding the initial and the end state of the transformation of the coordinate system.

17. The image generation device of claim 16, wherein the frame data generation means is comprised of a computation unit for computing the number of frames corresponding to the operation time, and an interpolation and assignment unit for assigning the starting and ending parameters to a first image frame and a final image frame, respectively, interpolating transitional parameters between the starting and ending parameters, and assigning the transitional parameters to a frame placing between the first image frame and the final image frame.

18. The image generation device of claim 17 further comprising selection means for selecting one of a first mode for generating graphic data and inputting and/or editing each transformation and a second mode for reproducing the graphic data in accordance with the transformation.

19. The image generation device of claim 18 further comprising image clock output means for outputting an image clock to the frame data generation means and the composite image generation means when the second mode is selected, so that the image frame will be generated being synchronized with the image clock and will be displayed at the display means in order of the image frames.

20. The image generation device of claim 19 further comprising display information generation means for generating coordinates indicating location of a screen of the display means at an absolute coordinate system, the absolute coordinate system defining absolute location of each coordinate system, wherein the display means displays graphic data locating within the screen together with another image.

21. A computer image generating apparatus comprising:

means for generating graphic data including means for displaying the graphic data and means for modifying the displayed graphic data by an operator;

graphic data storage means for storing at least two separate groups of graphic data including corresponding coordinate systems and the locations of each group of graphic data;

graphic parameter input means for inputting a plurality of different data parameters to describe a transformation of each coordinate system along with a lapse of time, an initial state and end state of each parameter for describing the parameter at the start and the end of the transformation, respectively, and an operation time to be measured from the start to the end of the transformation;

graphic parameter storage means for holding the data inputted by the graphic parameter input means;

frame data generation means for time dividing the changes observed from the start to the end of the transformation of the graphic data into a number of successive frames corresponding to the operation time to generate frame data; and composite image generation means for reading the graphic data on all of the coordinate systems, converting coordinates of each graphic data in accordance with the frame data, and generating a composite image signal for each frame by composing the graphic data on all of the coordinate systems.

* * * * *